United States Patent [19]

Maistrovich et al.

[11] Patent Number: 5,814,278
[45] Date of Patent: Sep. 29, 1998

[54] SHROUDED REACTION VESSEL

[75] Inventors: Anthony Robert Maistrovich, Woodbury, Minn.; James Alan Higgins, River Falls, Wis.; Wade Douglas Kretman, St. Paul, Minn.; Dennis Alan Davidson, Maplewood, Minn.; Katrina M. Jackson, Woodbury, Minn.; William Ross Berggren, Woodbury, Minn.

[73] Assignee: Minnesota Mining and Manufacturing Company, St. Paul, Minn.

[21] Appl. No.: 638,432

[22] Filed: Apr. 26, 1996

[51] Int. Cl.⁶ ............................ G05D 23/00; B01J 10/00
[52] U.S. Cl. ................. 422/109; 422/129; 422/202; 422/225
[58] Field of Search .................. 422/105, 109, 422/129, 137, 165, 166, 167, 202, 225

[56] References Cited

U.S. PATENT DOCUMENTS

| | | |
|---|---|---|
| 2,241,176 | 5/1941 | Boecler et al. . |
| 2,295,942 | 9/1942 | Fields . |
| 2,458,068 | 1/1949 | Fuller . |
| 2,800,088 | 7/1957 | Leibundgut . |
| 2,807,049 | 9/1957 | Kimbro . |
| 3,505,513 | 4/1970 | Fowler et al. . |
| 3,564,657 | 2/1971 | Aoki . |
| 3,619,145 | 11/1971 | Crawford et al. . |
| 3,728,057 | 4/1973 | Grundmann et al. . |
| 3,937,609 | 2/1976 | Ryder . |
| 4,234,543 | 11/1980 | Matovich ............................ 422/109 |
| 4,364,893 | 12/1982 | Waters . |
| 4,526,526 | 7/1985 | Krogh . |
| 4,609,509 | 9/1986 | Sarracino . |
| 4,758,146 | 7/1988 | Piazzola . |
| 4,776,206 | 10/1988 | Armstrong et al. . |
| 4,784,597 | 11/1988 | Akane . |
| 4,808,098 | 2/1989 | Chan et al. . |
| 5,034,181 | 7/1991 | Billiu . |
| 5,045,259 | 9/1991 | Berdasco et al. . |
| 5,078,006 | 1/1992 | Maresca, Jr. et al. . |
| 5,088,908 | 2/1992 | Ezaki et al. . |
| 5,265,465 | 11/1993 | Thomas . |
| 5,272,646 | 12/1993 | Farmer . |
| 5,275,545 | 1/1994 | Ohyanagi et al. . |
| 5,293,771 | 3/1994 | Ridenour . |
| 5,310,329 | 5/1994 | Cree . |
| 5,318,427 | 6/1994 | Voss . |
| 5,368,460 | 11/1994 | Weavil et al. . |
| 5,368,825 | 11/1994 | Calcote et al. ...................... 422/198 |
| 5,374,382 | 12/1994 | Nishiwaki et al. . |
| 5,403,539 | 4/1995 | Taka et al. . |
| 5,421,154 | 6/1995 | Pfefferle et al. ........................ 60/274 |
| 5,441,395 | 8/1995 | Planeta . |
| 5,464,336 | 11/1995 | Planeta . |
| 5,565,150 | 10/1996 | Dillehay et al. ....................... 264/3.3 |

FOREIGN PATENT DOCUMENTS

| | | |
|---|---|---|
| 0 070 037 A | 1/1983 | European Pat. Off. . |
| 0 270 725 A | 6/1988 | European Pat. Off. . |
| 0 495 739 A1 | 1/1992 | European Pat. Off. . |
| 57-136933 A | 8/1982 | Japan . |
| 61-164640 A | 12/1986 | Japan . |
| 94 01201 A | 1/1994 | WIPO . |

OTHER PUBLICATIONS

Chemical Engineering Progress, vol. 87, No. 3, 1 Mar. 1991, pp. 85–91, "Design and Operate Plants for Inherent Safety Part 1".

*Primary Examiner*—Nina Bhat
*Attorney, Agent, or Firm*—Carolyn V. Peters

[57] ABSTRACT

A reactor system that can safely use general purpose electrical devices and unregulated surface temperature heat sources even though a flammable and/or combustible substance is being processed in the reactor or is within the processing area. The reactor system includes a reaction vessel and at least one process control device proximate the reaction vessel which is a possible ignition source for flammable and combustible materials. A shroud encloses the ignition source within a chamber and the chamber is provided with an inactive environment which is effective for preventing the ignition source from igniting any flammable or combustible substance that may enter the chamber.

33 Claims, 1 Drawing Sheet

SHROUDED REACTION VESSEL

FIELD OF THE INVENTION

This invention relates to shrouds for reaction vessels.

BACKGROUND OF THE INVENTION

As the demand for high performance materials and closely controlled processing parameters increases, there is a growing need for reactor systems that permits the use of ignition sources, such as general purpose electrical devices and high temperature heat sources, near flammable or combustible substances. However, general purpose electrical devices usually have exposed electrical contacts that can contain enough energy to ignite flammable and combustible vapors, while high temperature heat sources can produce surface temperatures that approach and exceed the autoignition temperature of flammable and combustible substances.

Flammable and combustible substances that can be ignited by exposed electrical contact sources are well defined in safety literature. Such substances typically have a low flash point, which is defined by the National Fire Protection Association (NFPA) as the temperature at which a liquid or a volatile solid gives off sufficient vapor to form an ignitable mixture with air near the surface of the liquid or within a test vessel. Flammable or combustible substances also generally have concentration ranges above and below which ignition will not occur. Flammable materials and combustible materials are differentiated by the ease with which they burn.

Flammable materials are those solids, liquids, vapors and gases that ignite easily and burn rapidly. Flammable solids can generally be classified as: (1) dusts or fine powders, (e.g., various metals and organic substances such as cellulose and flour); (2) films, fibers and fabrics constructed of materials having a low ignition point; (3) low temperature autoignition solids such as white phosphorus; and (4) biodegradable solids in which internal heat can be generated by microbial or other degradation activity, (e.g., fish meal and wet cellulosics). Flammable liquids are defined by NFPA and the United States Department of Transportation as liquids having (i) a flash point below 37.7° C. (100° F.), as measured in a closed cup apparatus, and (ii) a vapor pressure of less than 377 kN/m$^2$ (40 psig). Flammable gases are gases which ignite very easily and sustain a flame and heat propagation rate which is so great as to resemble an explosion, especially when the gas is confined. Flammable gases are extremely dangerous fire hazards and require precisely regulated storage conditions.

A combustible material is generally defined as a solid that is comparatively difficult to ignite and burns relatively slowly, or a liquid having a flash point above 37.7° C. (100° F.). The rate and ease with which solids combust often depends as much on their state of subdivision (e.g., fibrous whiskers versus solid block) as on their chemical composition. For example, many metals will ignite and burn rapidly when in powder or flake form, while most will not burn when formed as a bulk solids. Cellulose is combustible when formed as a textile fabric or paper, but is flammable when provided as a fine fiber such as cotton linters. A plastic that burns at flame temperature is a greater fire hazard when formed as a foam rather than a bulk solid.

NFPA has developed safety standards to permit the safe processing of materials around flammable or combustible substances. These standards are based upon defined classified areas which include (i) Class 1, Group A to D classified areas which involve the presence of flammable vapors, (ii) Class 2, Group E to G classified areas which involve the presence of combustible dust, and (iii) Class 3 classified areas which involve the presence of ignitable figers and flyings. NFPA restricts the use of ignition sources in all of these classified areas. For example, exposed electrical contact sources and unregulated surface temperature heat sources are prohibit in Class 1, Group D areas. Hence, flammable and combustible vapors and gases, as well as materials that emit such vapors and gases, may be stored or processed in areas which include only those types of equipment which have been specially designed for use in such environments.

Equipment suitable for use around flammable and combustible airborne materials is designed to prevent the equipment from serving as an ignition source. Generally, equipment suitable for such uses falls into at least one of five categories: (1) pneumatic or hydraulic equipment, (2) intrinsically safe electrical equipment, (3) explosion proof equipment, (4) remotely located equipment and (5) equipment with regulated surface temperature interlocks. Pneumatic and hydraulic devices use air or fluid to operate and therefore do not serve as ignition sources. Intrinsically safe electrical devices are designed to utilize insufficient electrical current to ignite a flammable or combustible airborne material. Explosion proof devices are retained within shells designed to contain any resultant explosion in order to prevent damage to surrounding objects and people. Remote devices are located outside the area containing the flammable or combustible airborne materials and are attached to a reaction vessel located in the classified area by tubes or insulated wires and connectors. Regulated surface temperature devices are devices whose surface temperature is controlled so that it cannot exceed 80 percent of the lowest autoignition temperature of those flammable and combustible substance which may be present in the area. All five types of these specially designed equipment are typically (i) larger, (ii) more expensive, (iii) less responsive, and/or (iv) produce lower conversion rates, than general purpose electrical devices and unregulated surface temperature heat sources.

Hence, there remains a growing need for a reactor system that permits the use of general purpose electrical devices and/or unregulated surface temperature heat sources on or near reaction vessels that contain or are, of necessity, located in an area containing flammable or combustible substances.

SUMMARY OF THE INVENTION

The present invention provides a reactor system that can safely use equipment which is an ignition source even though flammable or combustible substances are being processed by the system or the system is being used in an area containing flammable or combustible substances. The present invention includes a reaction vessel and at least one ignition source on or near the reaction vessel. A shroud surrounds at least a portion of the reaction vessel and encloses the ignition source within a chamber defined by the shroud. An environment is maintained within the chamber that is incapable of supporting the ignition of any flammable or combustible substances found within the chamber. The reaction vessel may be a batch, semibatch or continuous reaction vessel and may include a heat transfer system to control the temperature of materials within the reaction vessel.

The present invention also provides a method of processing a material utilizing such a reactor system. The process is unique in that the reactor system permits the utilization of an ignition source to process the material (i.e., a general purpose fluorescent bulb to initiate a reaction) even though a flammable or combustible substance is used and/or produced in the reaction vessel, or the reactor system is located in an area containing flammable or combustible airborne materials. The invention permits the use of a broad range of devices to effect, control and/or monitor the processing of materials, with the devices available for use generally less expensive, more responsive, and smaller than those which could previously be used in such situations. The ability to utilize such devices often translates into a higher conversion rate of reactants to product in the reaction vessel. For example, certain high performance materials require the use of flammable or combustible materials (e.g., reactants or solvents) or produce flammable or combustible materials (e.g., intermediates, by-products or products) yet require precise control and monitoring of process conditions in order to efficiently produce the product. The process utilizing the reactor system of the present invention allows such materials to be manufactured in an economical manner. In addition, the reactor system of the present invention allows manufacturing space to be used more efficiently, since such reactor systems can also be used to process materials that do not contain flammable or combustible substances when such reactor systems are not being used to process flammable or combustible substances, (i.e., the reactor system of the present invention can function as both a general purpose reactor and a classified area reactor, dispensing with the need for two different reactors to service each of these requirements).

DETAILED DESCRIPTION OF THE INVENTION

The invention provides a reactor system 5 that allows for the safe use of ignition sources 20 proximate a reaction vessel 10 when the reaction vessel 10 is (i) processing a flammable or combustible substance, or (ii) located in an area that contains a flammable or combustible substance. The invention also provides a method of making product using such a reactor system 5.

Figure 1:
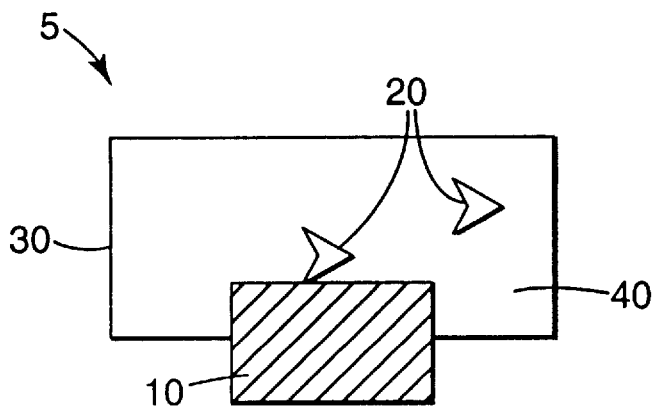
FIG. 1 is a schematic diagram of one embodiment of the reactor system in which the shroud encloses a portion of the reaction vessel.
Figure 2:
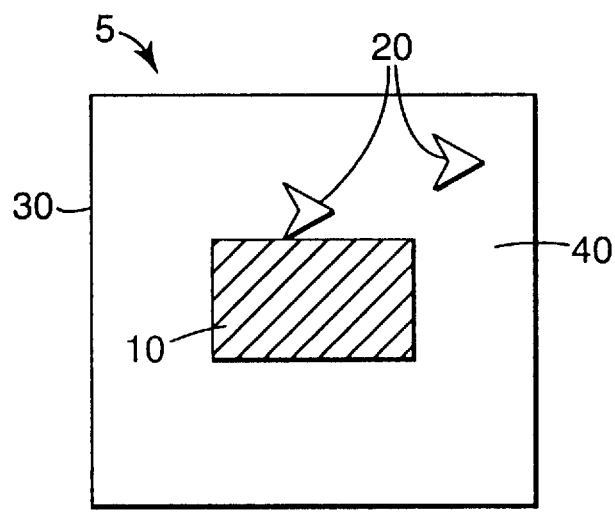
FIG. 2 is a schematic diagram of a second embodiment of the reactor system in which the shroud encloses the entire reaction vessel.

The invention, shown in FIG. 1, comprises a reaction vessel 10 and at least one ignition source 20 on or near the reaction vessel 10. A shroud 30 surrounds at least a portion of the reaction vessel 10 and forms a chamber 40 in which the ignition source 20 is retained. An inactive environment, effective for preventing the ignition source 20 from igniting any flammable or combustible substances, is maintained within the chamber 40. The shroud 30 may enclose the entire reaction vessel 10, as shown in FIG. 2.

The reaction vessel 10 may be any vessel suitable for storing, conveying, mixing, heating, reacting or otherwise processing chemical compounds. The reaction vessel 10 can be designed for batch, semibatch or continuous operations. Reaction vessels 10 upon which the reactor system 5 can be most advantageously employed are those in which at least one of the compounds being processed is a flammable or combustible material. In addition, while batch and semibatch reaction vessels can be used, continuous reaction vessels are generally the reaction vessel 10 of choice based upon the increased output and decreased operating costs associated with continuous reaction vessels. Typical batch reaction vessels include kettles, tanks, glove boxes, etc. A typical semibatch reaction vessel is a kettles equipped with tubes for the feeding of reactants/or the removal of product. Continuous reaction vessels include extruders, stirred tubular reaction vessels, continuous stirred tank reaction vessels, loop reaction vessels, static mixer reaction vessels, and the like.

The reaction vessel 10 can include a jacketed heat transfer system (not shown) to control the temperature within the vessel 10. Heat transfer systems (not shown) commonly utilize a heat transfer fluid, such as oil, to transfer heat to the reaction vessel 10.

As utilized herein, the term "ignition source" includes any energy source capable of igniting flammable or combustible substances. Common ignition sources 20 include specifically, but not exclusively, electrical devices having exposed electrical contact sources and unregulated heating devices capable of producing high surface temperatures.

As utilized herein, the term "exposed electrical contact source" means any electrical device having an exposed electrical contact capable of igniting an ignitable concentration of a flammable or combustible airborne material when sufficient oxygen is present. Exposed electrical contact sources include most general purpose electrical devices and some specialty devices designed for conditions other than operation in a flammable environments. Exposed electrical contact sources include a diverse range of electrical devices, including specifically, but not exclusively, electrical sensors, electrical switching means, illumination sources, inductor sources, electrical components and the like. Electrical sensors include, but are not limited to, sensors designed to measure pressure, temperature, light, pH, electrical conductivity, weight, stress, strain, fluid flow, fluid level and position. Electrical switching means include, but are not limited to, solenoids, flip switches, relays, contactors; and push button switches. Illumination sources include, but are not limited to, ultraviolet lights and infrared lights. Inductor sources include such items as the ballast elements for fluorescent light sources. Other electrical components include such items as rectifiers, transistors, capacitors and resistors.

As utilized herein, the term "unregulated heating device" and "unregulated surface temperature heat sources" are used interchangeably to includes any device capable of producing a surface temperature sufficient to ignite a flammable or combustible substance located in sufficient proximity to the device. Unregulated heating devices include, but are not limited to, oil heaters, steam heaters, dry air heaters, infrared lamps, incandescent lamps, and ultraviolet lamps.

As mentioned previously, many processes require the increased energy and/or faster response provided by general purpose electrical devices in order to produce product possessing the desired properties and characteristics. By way of example, the production of poly(1-alkene) involves the processing of flammable substances, but requires a highly responsive heater to produce poly(1-alkene) having the desired controlled inherent viscosity. In another example, ultraviolet radiation interactive photosensitive crosslinking reactions often involve the processing of a flammable substance and are highly dependent upon the intensity of the ultraviolet light. Thus, standard explosion proof ultraviolet lights often provide insufficient light because the large glass sleeve enclosing the lamp limits the number of lamps that can be positioned near the reaction vessel 10 and positions the illumination source further away from the reaction mixture within the reaction vessel 10.

Similarly, unregulated surface temperature heat sources are useful for increasing the conversion rates of some reactions. It is a generally accepted principal that an increase in processing temperature results in a corresponding increase in reaction rate. It is also understood that some multiphase radiation modified blends exhibit desirable surface segregation, resulting in a tough resinous release surface, at increased processing temperatures. The reactor system 5 of the present invention allows these advantages to be realized even in those situations where flammable and/or combustible substances are present.

The shroud 30 is configured and arranged to enclose at least one ignition source 20 within a chamber 40 which possesses an environment that is incapable of supporting the combustion of a flammable or combustible substance (hereinafter "inactive environment"). By way of example, the shroud 30 may be defined by: (i) the walls, ceiling and floor of a room containing a reaction vessel 10 and at least one ignition source 20, (ii) a sheet metal box enclosing the entire reaction vessel 10 and the ignition source 20; or (iii) a molded plastic encasement mounted over a portion of the reaction vessel 10 and enclosing the ignition source 20. Preferably the shroud 30 is sized and shaped to provide the smallest chamber 40 which comfortably encloses the ignition source 20, so as to minimize the volume which must be maintained as an inactive environment.

The shroud 30 may be constructed from any material capable of withstanding the various required processing conditions (e.g., temperature, pressure, humidity, magnetic fields, etc.) and able to maintain the necessary inactive environment. Suitable materials include, for example, wood, plaster board, metal, plastic, concrete and glass. Preferably the shroud 30 is constructed of a material which is also solvent resistant. The shroud 30 may be equipped with transparent and/or removable panels to allow viewing of and access to the reaction vessel 10 and the ignition source(s) 20 within the chamber 40 without requiring complete removal of the shroud 30.

In order for an environment to function as an "inactive environment" the environment must exclude at least one of the fundamental requirements for ignition. The three fundamental requirements for ignition are (i) a sufficient concentration of a fuel, such as a flammable solvent, (ii) a sufficient concentration of an oxidizer, such as oxygen and (iii) an ignition source, such as an exposed electrical contact source or an unregulated surface temperature heat source. Since the chamber 40 defined by the shroud 30 is specifically designed to contains an ignition source 20, the only options available for rendering the environment within the chamber 40 an "inactive environment" are the exclusion of fuel and/or oxidizer from the chamber 40. Environments effective for excluding fuel and/or oxidizer from the chamber 40 include specifically, but not exclusively, partial vacuums, complete vacuums, and unreactive gas purges.

As utilized herein, the term "unreactive gas" includes gases that will not react exothermically with flammable or combustible substances, and include specifically, but not exclusively, helium, neon, argon, krypton, xenon, nitrogen and carbon dioxide. Particularly useful unreactive gases are nitrogen and carbon dioxide due to their low cost and ready availability.

Monitoring devices (not shown) and interlocks (not shown) may be used to sense the concentration of flammable substance, combustible substance and/or oxidizer in the chamber 40 and shut off the ignition source 20, as well as the process, should the concentration of such substances in the chamber 40 exceed a predetermined safe concentration. Similarly, monitoring devices (not shown) and interlocks (not shown) may be used to sense the external surface temperature of the shroud 30 and shut off the heat source 20, as well as the process, should the surface temperature of the shroud 30 exceed a predetermined percent of the autoignition temperature of any flammable or combustible material which could be outside the shroud 30.

The chamber 40 may be sealed or open to the surrounding atmosphere. When the inactive environment is a vacuum, a sealed chamber 40 is preferred. In contrast, when the inactive environment is an unreactive gas, the shroud 30 preferably includes relatively small openings for purposes of permitting any contaminants, such as atmospheric oxygen, to be flushed from the chamber 40 by a continuous renewal of the inactive environment within the chamber 40.

The shroud 30 may optionally be thermally insulated (not shown) or cooled by a heat exchange system (not shown). Inclusion of such optional thermal control devices may be justified when large amounts of heat will be generated by the ignition source 20 within the chamber 40 and flammable or combustible substances may be outside the shroud 30.

The reactor system 5 permits the processing of chemical compounds in a reaction vessel 10 using general purpose electrical devices even though the process involves the use of flammable and/or combustible materials, or the process is conducted in an area containing flammable and/or combustible materials.

The reactor system 5 has two primary advantages over current reactors. First, the reactor system 5 allows ignition sources 20 to be used when processing chemical compositions which contain or produce flammable and/or combustible substances. The use of ignition sources 20 are generally preferred over those which are specially designed for use in classified areas as they are generally more responsive and less expensive. This increase in responsiveness permits the economical production of previously unattainable high performance products. Secondly, the reactor system 5 can be used to safely process chemical compounds in rooms which contain flammable and/or combustible materials, thus permitting reactors designed for use in such classified areas to be used to process nonflammable and noncombustible chemical materials as well since the reactor system 5 is equipped with the necessary and/or desired general purpose electrical device rather than the more restrictive special purpose electrical device.

The following examples illustrate processes utilizing two embodiments of the invention.

EXAMPLE 1

A multiple zone twin screw extruder equipped with independently controlled water cooled heat transfer jackets around each zone, and independently controlled electrical heaters outside each jacket, is fitted with a rectangular stainless steel shroud which encases both the electric heaters and the heat transfer jackets. Nitrogen gas is pumped under pressure into the chamber defined by the shroud to create an inactive environment within the chamber which contains less than 4% oxygen. Poly(1-alkene), a polymer whose average molecular weight is highly dependent upon processing temperature, is synthesized in the extruder. The temperature of the polymerization mixture inside the extruder is carefully controlled in order maximize the percentage of the resultant polymer falling within a desired molecular weight range. Changes in the molecular weight of the resultant polymer can conveniently be estimated by periodically measuring the inherent viscosity of the resultant composition, with a variation of less than ±0.2 dL/g attainable with the twin screw extruder system described herein.

EXAMPLE 2

A multiple zone stirred tubular reaction vessel comprising a glass tube with a mixing shaft extending along the longitudinal axis, is equipped with independently controlled glass heat transfer jackets containing an ultraviolet radiation transparent heat transfer fluid around each zone. General purpose fluorescent ultraviolet lights are positioned just outside the jackets. A rectangular polycarbonate shroud with removable panels encases the entire jacketed reaction vessel, heat transfer jackets and lights within a chamber. Nitrogen gas is pumped under pressure into the chamber defined by the shroud to create an inactive environment within the chamber which contains less than 4% oxygen. An ultraviolet radiation interactive mixture, such as an ultraviolet radiation polymerized polymer, containing at least one flammable and/or combustible component is processed in the reaction vessel. Other radiation interactive materials, such as materials that melt, vaporize, polymerize, cross link or otherwise change their physical or chemical form when exposed to sufficient radiation, may be conveniently processed in this reaction vessel. Examples of materials that are sensitive to infrared radiation include thermoplastics and thermally cured polymers. Examples of materials that are sensitive to visible radiation include photographic emulsions.

One skilled in the art can envision many other embodiments of the invention by combining the various elements that have been described in such a way as to allow devices with ignition sources to be used proximate to reaction vessels which are either processing flammable or combustible substances or processing materials in a room that contain flammable or combustible substances.

We claim:

1. A system that permits the safe use of a reaction vessel equipped with an ignition source to process flammable or combustible substances, comprising:
   (a) a reaction vessel defining an internal reaction chamber free of any ignition sources;
   (b) at least one ignition source in communicative proximity to said reaction vessel for measuring, controlling or effecting a processing parameter within the reaction chamber;
   (c) at least one shroud externally connected to the reaction vessel and enclosing at least one ignition source within an isolation chamber defined between the shroud and the reaction vessel; and
   (d) an inactive environment within said isolation chamber;
   (e) wherein the reaction chamber and the isolation chamber are separate and independent chambers with mass transfer prohibited between the chambers.

2. The system of claim 1 wherein said system further comprises a heat transfer system in thermal communication with the reaction chamber to control temperatures within the reaction chamber.

3. The system of claim 2 wherein the heat transfer system utilizes a heat transfer fluid.

4. The system of claim 1 wherein the reaction vessel is selected from the group consisting of a twin screw extruder, a single screw extruder, a stirred tube reactor, a continuous stirred tank, a loop reaction vessel, or a static mixer.

5. The system of claim 1 wherein the inactive environment within the isolation chamber is a partial vacuum which is unable to support combustion.

6. The system of claim 1 wherein the inactive environment within the isolation chamber is a gas or a mixture of gases that cannot support combustion.

7. The system of claim 1 wherein the system further comprises at least one monitoring device and associated interlock effective for sensing a concentration of an oxidizer within at least one isolation chamber and shutting off the ignition source within the isolation chamber should the sensed concentration of oxidizer in the isolation chamber exceed a predetermined maximum acceptable concentration.

8. The system of claim 1 wherein the system further comprises at least one monitoring device and associated interlock effective for sensing the outer surface temperature of at least one shroud and shutting off the ignition source within the isolation chamber defined by the sensed shroud should the sensed outer surface temperature of the sensed shroud exceed a predetermined maximum acceptable temperature.

9. A system that permits the safe use of a reaction vessel equipped with an ignition source to process flammable or combustible substances, comprising:
   (a) a reaction vessel having sidewalls and defining an internal reaction chamber free of any ignition sources, wherein at least a portion of at least one sidewall is transparent to radiation;
   (b) a means for emitting radiation positioned relative to the radiation transparent portion of the sidewall so as to transmit radiant energy through the transparent portion of the sidewall and into the reaction chamber, where said means includes at least one ignition source;
   (c) a shroud externally connected to the reaction vessel and enclosing said radiating means within an isolation chamber defined between the shroud and the reaction vessel; and
   (d) an inactive environment within said isolation chamber;
   (e) wherein the reaction chamber and the isolation chamber are separate and independent chambers with mass transfer prohibited between the chambers.

10. The system of claim 9 wherein said system further comprises a heat transfer system in thermal communication with the reaction chamber to control temperatures within the reaction chamber.

11. The system of claim 9 wherein the heat transfer system utilizes a heat transfer fluid.

12. The system of claim 9 wherein the reaction vessel is a tube having a cylindrical axis with lateral mixing elements attached to a shaft which extends along the cylindrical axis of the tube.

13. The system of claim 9 wherein the inactive environment within the isolation chamber is a partial vacuum which is unable to support combustion.

14. The system of claim 9 wherein the inactive environment within the isolation chamber is a gas or a mixture of gases that cannot support combustion.

15. The system of claim 9 wherein the system further comprises at least one monitoring device and associated interlock effective for sensing a concentration of an oxidizer within the isolation chamber and shutting off the radiation emitting means within the isolation chamber should the sensed concentration of oxidizer in the isolation chamber exceed a predetermined maximum acceptable concentration.

16. The system of claim 9 wherein the system further comprises at least one monitoring device and associated interlock effective for sensing the outer surface temperature of the shroud and shutting off the radiation emitting means within the isolation chamber should the sensed outer surface temperature of the shroud exceed a predetermined maximum acceptable temperature.

17. A system that permits the safe use of a reaction vessel equipped with an ignition source around flammable or combustible substances, comprising:

(a) a reaction vessel defining an internal reaction chamber having an absence of ignition sources;

(b) at least one ignition source in communicative proximity to the reaction vessel for measuring, controlling or effecting a processing parameter within the reaction chamber;

(c) at least one shroud externally attached to the reaction vessel and enclosing at least one ignition source within an isolation chamber defined between the shroud and the reaction vessel; and (d) means in fluid communication with the isolation chamber for creating and maintaining an inactive environment within the isolation chamber;

(e) wherein the reaction chamber and the isolation chamber are separate and independent chambers with mass transfer prohibited between the chambers.

18. A system, comprising:

(a) a reaction vessel defining an internal reaction chamber free of any ignition sources;

(b) at least one ignition source in communicative proximity to said reaction vessel for measuring, controlling or effecting a processing parameter within the reaction chamber;

(c) at least one shroud externally connected to the reaction vessel and enclosing at least one ignition source within an isolation chamber defined between the shroud and the reaction vessel; and (d) an inactive environment within said isolation chamber;

(e) wherein the reaction chamber and the isolation chamber are separate and independent chambers.

19. The system of claim 18 wherein the inactive environment within the isolation chamber is a gas or a mixture of gases that cannot support combustion.

20. The system of claim 18 wherein the system further comprises at least one monitoring device and associated interlock effective for sensing a concentration of an oxidizer within at least one isolation chamber and shutting off the ignition source within the isolation chamber should the sensed concentration of oxidizer in the isolation chamber exceed a predetermined maximum acceptable concentration.

21. The system of claim 18 wherein the system further comprises at least one monitoring device and associated interlock effective for sensing the outer surface temperature of at least one shroud and shutting off the ignition source within the isolation chamber defined by the sensed shroud should the sensed outer surface temperature of the sensed shroud exceed a predetermined maximum acceptable temperature.

22. The system of claim 18 wherein the system further comprises at least one monitoring device and associated interlock effective for sensing the outer surface temperature of at least one shroud and shutting off the ignition source within the isolation chamber defined by the sensed shroud should the sensed outer surface temperature of the sensed shroud exceed a predetermined maximum acceptable temperature.

23. A system, comprising:

(a) a reaction vessel defining an internal reaction chamber;

(b) at least one ignition source in communicative proximity to said reaction vessel for measuring, controlling or effecting a processing parameter within the reaction chamber;

(c) at least one shroud externally connected to the reaction vessel and enclosing at least one ignition source within an isolation chamber defined between the shroud and the reaction vessel; and (d) an inactive environment within said isolation chamber;

(e) wherein the reaction chamber and the isolation chamber are separate and independent chambers with intentional mass transfer prohibited between the chambers.

24. The system of claim 23 wherein the inactive environment within the isolation chamber is a gas or a mixture of gases that cannot support combustion.

25. The system of claim 23 wherein the system further comprises at least one monitoring device and associated interlock effective for sensing a concentration of an oxidizer within at least one isolation chamber and shutting off the ignition source within the isolation chamber should the sensed concentration of oxidizer in the isolation chamber exceed a predetermined maximum acceptable concentration.

26. A system, comprising;

(a) a reaction vessel having sidewalls and defining an internal reaction chamber free of any ignition sources, wherein at least a portion of at least one sidewall is transparent to radiation;

(b) a means for emitting radiation positioned relative to the radiation transparent portion of the sidewall so as to transmit radiant energy through the transparent portion of the sidewall and into the reaction chamber, where said means includes at least one ignition source;

(c) a shroud externally connected to the reaction vessel and enclosing said radiating means within an isolation chamber defined between the shroud and the reaction vessel; and (d) an inactive environment within said isolation chamber;

(e) wherein the reaction chamber and the isolation chamber are separate and independent chambers.

27. The system of claim 26 wherein the inactive environment within the isolation chamber is a gas or a mixture of gases that cannot support combustion.

28. The system of claim 26 wherein the system further comprises at least one monitoring device and associated interlock effective for sensing a concentration of an oxidizer within at least one isolation chamber and shutting off the ignition source within the isolation chamber should the sensed concentration of oxidizer in the isolation chamber exceed a predetermined maximum acceptable concentration.

29. The system of claim 26 wherein the system further comprises at least one monitoring device and associated interlock effective for sensing the outer surface temperature of at least one shroud and shutting off the ignition source within the isolation chamber defined by the sensed shroud should the sensed outer surface temperature of the sensed shroud exceed a predetermined maximum acceptable temperature.

30. A system, comprising:

(a) a reaction vessel having sidewalls and defining an internal reaction chamber, wherein at least a portion of at least one sidewall is transparent to radiation;

(b) a means for emitting radiation positioned relative to the radiation transparent portion of the sidewall so as to transmit radiant energy through the transparent portion of the sidewall and into the reaction chamber, where said means includes at least one ignition source;

(c) a shroud eternally connected to the reaction vessel and enclosing said radiating means within an isolation chamber defined between the shroud and the reaction vessel, and (d) an inactive environment within said isolation chamber;

(e) wherein the reaction chamber and the isolation chamber are separate and independent chambers with intentional mass transfer prohibited between the chambers.

31. The system of claim 30 wherein the inactive environment within the isolation chamber is a gas or a mixture of gases that cannot support combustion.

32. The system of claim 30 wherein the system further comprises at least one monitoring device and associated interlock effective for sensing a concentration of an oxidizer within at least one isolation chamber and shutting off the ignition source within the isolation chamber should the sensed concentration of oxidizer in the isolation chamber exceed a predetermined maximum acceptable concentration.

33. The system of claim 30 wherein the system further comprises at least one monitoring device and associated interlock effective for sensing the outer surface temperature of at least one shroud and shutting off the ignition source within the isolation chamber defined by the sensed shroud should the sensed outer surface temperature of the sensed shroud exceed a predetermined maximum acceptable temperature.

* * * * *